United States Patent
Soga et al.

(10) Patent No.: US 7,951,026 B2
(45) Date of Patent: May 31, 2011

(54) OIL PRESSURE CONTROL APPARATUS

(75) Inventors: Yoshinobu Soga, Toyota (JP); Ryoji Habuchi, Okazaki (JP); Yusuke Ogata, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 465 days.

(21) Appl. No.: 12/206,357

(22) Filed: Sep. 8, 2008

(65) Prior Publication Data

US 2009/0065318 A1    Mar. 12, 2009

(30) Foreign Application Priority Data

Sep. 10, 2007    (JP) .................................. 2007-234596

(51) Int. Cl.
*F16H 59/00* (2006.01)
(52) U.S. Cl. ......................................................... 474/28
(58) Field of Classification Search ........................ None
See application file for complete search history.

(56) References Cited

U.S. PATENT DOCUMENTS

| | | | |
|---|---|---|---|
| 6,503,169 B2 | 1/2003 | Nakano et al. | |
| 2009/0069131 A1* | 3/2009 | Soga | 474/18 |
| 2009/0264231 A1* | 10/2009 | Ogata et al. | 474/11 |
| 2010/0151977 A1* | 6/2010 | Ogata | 474/28 |

FOREIGN PATENT DOCUMENTS

| | | |
|---|---|---|
| DE | 101 10 144 A1 | 9/2001 |
| JP | 2000-130574 A | 5/2000 |
| JP | 2006-316832 A | 11/2006 |
| JP | 2007-255663 A | 10/2007 |

OTHER PUBLICATIONS

German Office Action for corresponding German patent application No. DE 10 2008 046 305.1 dated Jul. 13, 2010, pages.

* cited by examiner

*Primary Examiner* — Dirk Wright
(74) *Attorney, Agent, or Firm* — Sughrue Mion, PLLC

(57) ABSTRACT

In one embodiment, an oil pressure control apparatus includes a belt-driven continuously variable transmission, a lockup clutch provided in a torque converter, a primary regulator valve that regulates a line oil pressure that becomes a source pressure of oil pressure of various parts, and a lockup control valve that performs switching when controlling engagement/release of the lockup clutch. Control of the primary regulator valve and control of the lockup control valve are performed with a single linear solenoid valve. In this case, control of the primary regulator valve and control of the lockup control valve are performed in different ranges.

6 Claims, 6 Drawing Sheets

OIL PRESSURE CONTROL APPARATUS

CROSS-REFERENCE TO RELATED APPLICATION

This application claims priority under 35 U.S.C. §119(a) on Japanese Patent Application No. 2007-234596 filed in Japan on Sep. 10, 2007, the entire contents of which are herein incorporated by reference.

BACKGROUND OF THE INVENTION

1. Field of the Invention

The present invention relates to an oil pressure control apparatus of a vehicle power transmission apparatus.

2. Description of the Related Art

As a power transmission apparatus provided in a vehicle, a power transmission apparatus is known that has a belt-driven continuously variable transmission in which a belt is clamped with oil pressure to transmit motive power, and a gear ratio is changed by changing a belt contact radius, and a hydraulic lockup clutch that is provided in a hydrodynamic motive power transmission apparatus provided in a motive power transmission path and directly couples a motive power source side and the belt-driven continuously variable transmission side.

In an oil pressure control apparatus of this sort of vehicle power transmission apparatus, many control valves of various types, electromagnetic valves that control those control valves, and the like are provided. For example, a line oil pressure control valve that regulates a line oil pressure that becomes the source pressure for the oil pressure of various parts; a gearshift oil pressure control valve that regulates the line oil pressure that becomes the source pressure, and supplies a gearshift oil pressure that controls the gear ratio of the belt-driven continuously variable transmission to a driving-side pulley (primary pulley) of the belt-driven continuously variable transmission; a clamping oil pressure control valve that likewise regulates the line oil pressure that becomes the source pressure, and supplies a clamping oil pressure that controls belt clamping pressure of the belt-driven continuously variable transmission to a driven-side pulley (secondary pulley) of the belt-driven continuously variable transmission; a lockup control valve that performs switching when controlling engagement/release of the lockup clutch; and the like are provided. Also provided are linear electromagnetic valves, ON-OFF electromagnetic valves, or the like for controlling each of these control valves.

Conventionally, control of the line oil pressure control valve and control of the lockup control valve are performed with one linear electromagnetic valve, by supplying a control oil pressure of the one linear electromagnetic valve to the line oil pressure control valve and the lockup control valve. In this case, by switching an oil path according to engagement/release of the lockup clutch, the control oil pressure of the linear electromagnetic valve is supplied to either one of the line oil pressure control valve and the lockup control valve. JP 2000-130574A discloses technology in which only control of the line oil pressure control valve is performed with a single linear electromagnetic valve.

Incidentally, when a configuration is adopted in which an oil path is switched according to engagement/release of a lockup clutch as described above, it is necessary to provide a dedicated ON-OFF electromagnetic valve for switching that oil path. That is, separate electromagnetic valves are necessary for switching between control of the line oil pressure control valve and control of the lockup control valve. As a result, there is the problem that such a configuration leads to increased cost and size of the apparatus.

SUMMARY OF THE INVENTION

It is an object of the invention to provide an oil pressure control apparatus capable of controlling a line oil pressure control valve and a lockup control valve with a single electromagnetic valve, without providing a dedicated ON-OFF electromagnetic valve for switching between control of the line oil pressure control valve and control of the lockup control valve.

The invention provides an oil pressure control apparatus that includes a belt-driven continuously variable transmission in which a belt is clamped with oil pressure to transmit motive power, and a gear ratio is changed by changing a belt contact radius; a hydraulic lockup clutch provided in a hydrodynamic power transmission apparatus provided between a motive power source and the belt-driven continuously variable transmission, the lockup clutch directly coupling the motive power source side and the belt-driven continuously variable transmission side; a line oil pressure control valve that regulates a line oil pressure that becomes a source pressure of oil pressure of various parts; and a lockup control valve that is switched when controlling engagement/release of the lockup clutch; in which control of the line oil pressure control valve and control of the lockup control valve are performed with one electromagnetic valve, and the control of the line oil pressure control valve and the control of the lockup control valve are performed in different ranges that do not overlap each other.

According to the above configuration, with a single electromagnetic valve, control of regulation of the line oil pressure is performed in the control range of the line oil pressure control valve, and control of engagement/release of the lockup clutch is performed in the control range of the lockup control valve. Thus, it is not necessary to provide a switching valve for switching between control of the line oil pressure control valve and control of the lockup control valve, or a dedicated ON-OFF electromagnetic valve for controlling that switching valve. Accordingly, it is possible to perform control of the line oil pressure control valve and control of the lockup control valve with a single electromagnetic valve, without providing a dedicated ON-OFF electromagnetic valve for switching between control of the line oil pressure control valve and control of the lockup control valve. As a result, it is possible to avoid increases in apparatus cost and size.

Here, it is preferable that the control range of the line oil pressure control valve is set to a fixed range of a control oil pressure of the electromagnetic valve, and the control range of the lockup control valve is set to a remaining range.

Also, it is preferable that in the control range of the lockup control valve, control of the line oil pressure control valve is performed with an electromagnetic valve other than the one electromagnetic valve. In this case, the other electromagnetic valve may be, for example, an electromagnetic valve that controls a clamping oil pressure control valve that supplies a clamping oil pressure that controls a belt clamping pressure of the belt-driven continuously variable transmission to a driven-side pulley of the belt-driven continuously variable transmission. By adopting such a configuration, in the control range of the lockup control valve, it is possible to avoid a condition in which regulation of the line oil pressure is not controlled.

The following two aspects of the invention are given as examples of a specific configuration in which the control range of the line oil pressure control valve is set to a fixed range of the control oil pressure of the electromagnetic valve, and the control range of the lockup control valve is set to a remaining range.

According to the first aspect, between the line oil pressure control valve and the electromagnetic valve, a depressurizing valve is provided that, in the control range of the lockup control valve, can set an output oil pressure to the line oil pressure control valve to "0". In this case, while the output oil pressure to the line oil pressure control valve is "0", control of the lockup control valve is performed, and when the output oil pressure to the line oil pressure control valve exceeds "0", control of the line oil pressure control valve is performed.

According to the second aspect, the line oil pressure control valve is configured such that, in the control range of the lockup control valve, the control oil pressure of the electromagnetic valve that contributes to control of the line oil pressure by the line oil pressure control valve is "0". In this case, while the control oil pressure of the electromagnetic valve that contributes to control of the line oil pressure is "0", control of the lockup control valve is performed, and when the control oil pressure of the electromagnetic valve that contributes to control of the line oil pressure exceeds "0", control of the line oil pressure control valve is performed.

According to the invention, in an oil pressure control apparatus, it is possible to perform control of a line oil pressure control valve and control of a lockup control valve with a single electromagnetic valve, without providing a dedicated electromagnetic valve for switching between control of the line oil pressure control valve and control of the lockup control valve.

DESCRIPTION OF THE PREFERRED EMBODIMENTS

Hereinafter, preferred embodiments of the present invention will be described in detail with reference to the accompanying drawings.

Figure 1:
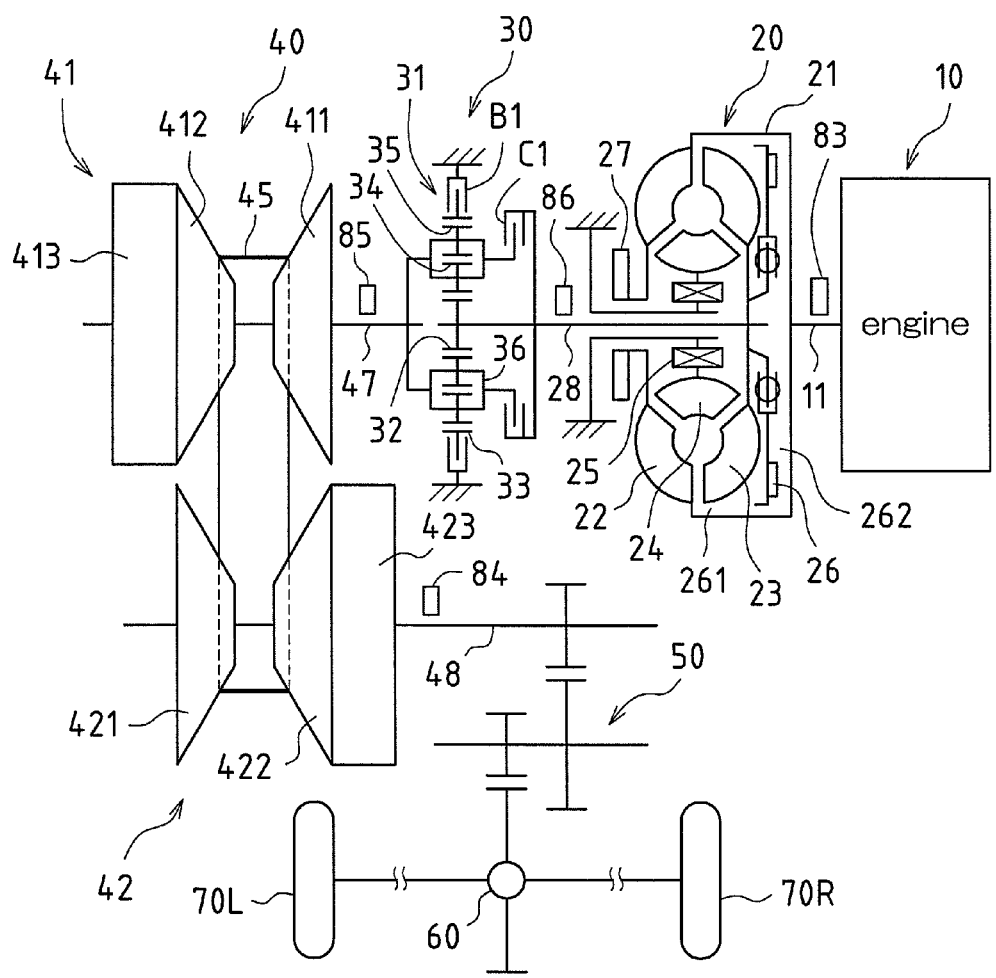
FIG. 1 shows the schematic configuration of a vehicle drive apparatus according to an embodiment.

FIG. 1 shows the schematic configuration of a vehicle drive apparatus according to an embodiment.

The example vehicle drive apparatus shown in FIG. 1 is preferably adopted in an FF (front engine/front drive)-type vehicle. This vehicle drive apparatus is provided with an engine (internal combustion engine) 10 that is a motive power source for travel, a torque converter 20, a forward/rearward switching apparatus 30, a belt-driven continuously variable transmission (CVT) 40, a deceleration gear apparatus 50, and a differential gear apparatus 60. In this vehicle drive apparatus, output of the engine 10 is transmitted from the torque converter 20 to the differential gear apparatus 60 via the forward/rearward switching apparatus 30, the belt-driven continuously variable transmission 40, and the deceleration gear apparatus 50, and distributed to left and right drive wheels 70L and 70R. A power transmission mechanism is configured with, for example, the torque converter 20, the forward/rearward switching apparatus 30, and the belt-driven continuously variable transmission 40.

The torque converter 20 is a hydrodynamic transmission apparatus that transmits motive power via a fluid, and is provided with a pump impeller 22, that is provided integrated with a front cover 21 to which an output shaft 11 of the engine 10 is linked; and a turbine runner 23 that faces the pump impeller 22, is provided adjacent to the inner face of the front cover 21, and is linked to the forward/rearward switching apparatus 30 via a turbine shaft 28. Specifically, the pump impeller 22 and the turbine runner 23 are provided with many blades (not shown), a spiral flow of the fluid is caused by rotation of the pump impeller 22, and by feeding that spiral flow to the turbine runner 23, torque is applied to cause the turbine runner 23 to rotate.

In a portion of the inner circumferential side of the pump impeller 22 and the turbine runner 23, a stator 24 is disposed that changes the flow direction of fluid that has been fed out from the turbine runner 23 so that the fluid flows into the pump impeller 22. The stator 24 is linked to a predetermined fixed portion via a unidirectional clutch 25. Also, the pump impeller 22 is provided with a mechanical oil pump (oil pressure source) 27 that, due to being rotationally driven by the engine 10, generates oil pressure in order to supply working oil to various parts of an oil pressure control circuit 100 (see FIG. 3).

The torque converter 20 is provided with a lockup clutch 26. The lockup clutch 26 is disposed in parallel with an actual torque converter configured from the pump impeller 22, the turbine runner 23, and the stator 24, and the lockup clutch 26 is held by the turbine runner 23 in a state facing the inner face of the front cover 21. The lockup clutch 26 is pressed against the inner face of the front cover 21 by oil pressure, and thus directly transmits torque from the front cover 21, which is an input member, to the turbine runner 23, which is an output member. Here, by controlling that oil pressure, it is possible to control the clutch amount of the lockup clutch 26. Specifically, the lockup clutch 26, by controlling a differential pressure (lockup differential pressure) $\Delta P$ of a lockup engaging oil pressure PON supplied to an engaging-side oil pressure chamber 261 and a lockup releasing oil pressure POFF supplied to a releasing-side oil pressure chamber 262 with a lockup control valve 140 of the oil pressure control circuit 100 (see FIG. 3), is completely engaged, half-engaged (engagement in a slipping state), or released.

By completely engaging the lockup clutch 26, the front cover 21 (pump impeller 22) and the turbine runner 23 rotate as a single body. Also, by engaging the lockup clutch 26 in a predetermined slipping state (half-engaged state), the turbine runner 23 rotates following the pump impeller 22 with a predetermined amount of slippage during driving. On the other hand, the lockup clutch 26 is released by setting the lockup differential pressure $\Delta P$ to a negative value. Engagement/release of the lockup clutch 26 by the oil pressure control circuit 100 will be described below.

The forward/rearward switching apparatus 30 is provided with a double pinion planetary gear apparatus 31, a forward movement clutch C1, and a rearward movement brake B1.

A sun gear 32 of the planetary gear apparatus 31 is linked together with the turbine shaft 28 of the torque converter 20, and a carrier 36 is linked together with an input shaft 47 of the belt-driven continuously variable transmission 40. The carrier 36 and the sun gear 32 are selectively linked via the forward movement clutch C1. A ring gear 33 is selectively fixed to a housing via the rearward movement brake B1.

Between the sun gear 32 and the ring gear 33, an inside pinion gear 34 that engages with the sun gear 32, and an outside pinion gear 35 that engages with the inside pinion gear 34 and the ring gear 33, are disposed. The pinion gears 34 and 35 are held by the carrier 36 such that they can rotate and revolve.

The forward movement clutch C1 and the rearward movement brake B1 are both hydraulic friction engaging elements for travel that are engaged/released with an oil pressure actuator. Due to the forward movement clutch C1 being engaged and the rearward movement brake B1 being released, a state is established in which the forward/rearward switching apparatus 30 rotates as one body, and in the forward/rearward switching apparatus 30, a forward motive power transmission path is formed. In this state, driving force in the forward direction is transmitted to the belt-driven continuously variable transmission 40 side. On the other hand, due to the rearward movement brake B1 being engaged and the forward movement clutch C1 being released, a rearward motive power transmission path is formed in the forward/rearward switching apparatus 30. In this state, the input shaft 47 rotates in a reverse direction relative to the turbine shaft 28, and this driving force in the rearward direction is transmitted to the belt-driven continuously variable transmission 40 side. When the forward movement clutch C1 and the rearward movement brake B1 are both released, the forward/rearward switching apparatus 30 is in neutral (a blocked state), in which motive power transmission between the engine 10 and the belt-driven continuously variable transmission 40 is blocked.

In more detail, the forward movement clutch C1 and the rearward movement brake B1 are engaged/released by a manual valve 170 of the oil pressure control circuit 100 (see FIG. 3) being mechanically switched according to operation of a shift lever 87 (see FIG. 2) are both hydraulic friction engaging elements for travel that are engaged/released with an oil pressure actuator. The shift lever 87, for example, is disposed to the side of a driver seat and is operated to switch by a driver. The shift lever 87 is selectively operated to shift positions such as a parking position "P" for parking, a reverse position "R" for rearward travel, a neutral position "N" that blocks motive power transmission, and a drive position "D" for forward travel. In the parking position "P" and the neutral position "N", the forward movement clutch C1 and the rearward movement brake B1 are both released. In the reverse position "R", the rearward movement brake B1 is engaged, and the forward movement clutch C1 is released. In the drive position "D", the forward movement clutch C1 is engaged, and the rearward movement brake B1 is released. Engagement/release of the friction engaging elements for travel (the forward movement clutch C1 and the rearward movement brake B1) of the forward/reverse switching apparatus 30 by the oil pressure control circuit 100 will be described below.

The belt-driven continuously variable transmission 40 transmits motive power by clamping a transmission belt 45 with oil pressure, and changes the gear ratio by changing the belt contact radius of the transmission belt 45. The belt-driven continuously variable transmission 40 includes a driving-side pulley (primary pulley) 41 provided on the input shaft 47, a driven-side pulley (secondary pulley) 42 provided on an output shaft 48, and the transmission belt 45, which is made of metal and is wrapped around both of these pulleys 41 and 42. The belt-driven continuously variable transmission 40 is configured such that motive power is transmitted via frictional force between both pulleys 41 and 42 and the transmission belt 45.

The driving-side pulley 41 is a variable pulley whose effective diameter is variable, and is configured from a fixed sieve 411 that has been fixed to the input shaft 47, and a movable sieve 412 disposed on the input shaft 47 in a state in which the movable sieve 412 is slidable in only the axial direction. The driven-side pulley 42 likewise is a variable pulley whose effective diameter is variable, and is configured from a fixed sieve 421 that has been fixed to the output shaft 48, and a movable sieve 422 disposed in the output shaft 48 in a state in which the movable sieve 422 is slidable in only the axial direction. In the movable sieve 412 of the driving-side pulley 41, an oil pressure actuator 413 for changing a V channel width between the fixed sieve 411 and the movable sieve 412 is provided. Likewise in the movable sieve 422 of the driven-side pulley 42, an oil pressure actuator 423 for changing a V channel width between the fixed sieve 421 and the movable sieve 422 is provided.

In the belt-driven continuously variable transmission 40, by controlling an oil pressure (gearshift oil pressure) PIN of the oil pressure actuator 413 of the driving-side pulley 41, the V channel width of both pulleys 41 and 42 changes and thus the belt contact radius (effective diameter) of the transmission belt 45 is changed, so a gear ratio γ (=input shaft rotation speed NIN/output shaft rotation speed NOUT) changes continuously. Also, an oil pressure (clamping oil pressure) POUT of the oil pressure actuator 423 of the driven-side pulley 42 is controlled such that within a range that slippage of the transmission belt 45 does not occur, a predetermined belt clamping force (frictional force) that transmits transmission torque is generated.

Figure 2:
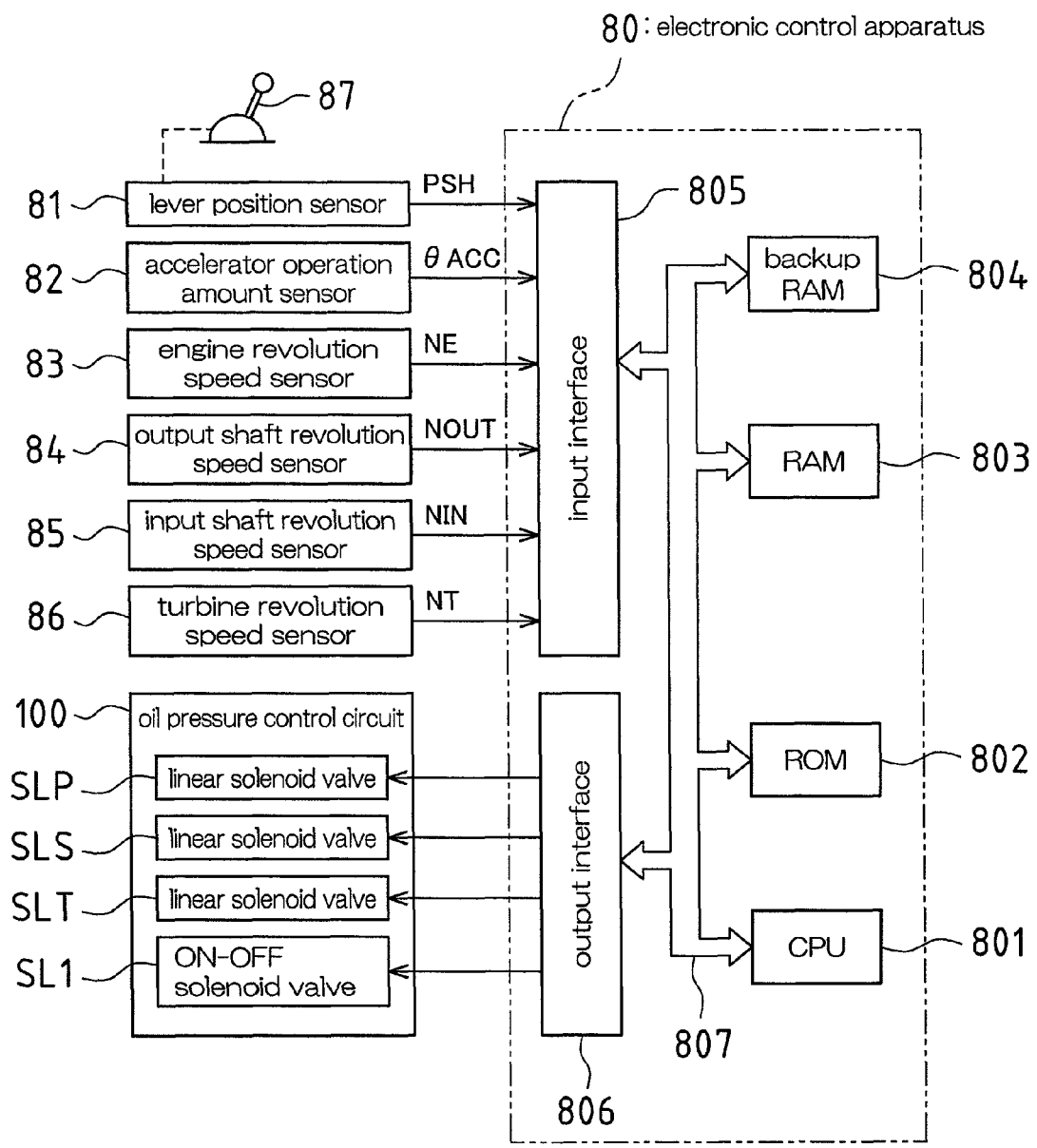
FIG. 2 is a block diagram that shows an example of a control system of a power transmission mechanism of the vehicle drive apparatus in FIG. 1.

The gearshift oil pressure PIN of the oil pressure actuator 413 of the driving-side pulley 41, and the clamping oil pressure POUT of the oil pressure actuator 423 of the driven-side pulley 42, are each regulated according to commands from an electronic control apparatus 80 (see FIG. 2). Here, the gearshift oil pressure PIN is controlled to regulate the pressure with a gearshift oil pressure control valve 120 of the oil pressure control circuit 100 (see FIG. 3). Also, the clamping oil pressure POUT is controlled to regulate the pressure with a clamping oil pressure control valve 130 of the oil pressure control circuit 100. Regulation of the gearshift oil pressure PIN and the clamping oil pressure POUT of the belt-driven continuously variable transmission 40 by the oil pressure control circuit 100 will be described below.

FIG. 2 is a block diagram that shows an example of a control system of a power transmission mechanism of the vehicle drive apparatus described above.

The electronic control apparatus 80 shown by way of example in FIG. 2 is provided with a CPU 801, a ROM 802, a RAM 803, and a backup RAM 804. The CPU 801 performs signal processing according to a program stored in advance in the ROM 802 while employing a temporary storage function of the RAM 803, and thus various controls are executed, such as control to regulate the gearshift oil pressure PIN and the clamping oil pressure POUT of the belt-driven continuously variable transmission 40, control of engagement/release of the friction engaging elements for travel (the forward movement clutch C1 and the rearward movement brake B1) of the forward/reverse switching apparatus 30, control of engagement/release of the lockup clutch 26 of the torque converter 20, and control to regulate a line oil pressure PL that becomes a source pressure of the oil pressure of various parts.

Described in more detail, various control programs, maps referred to when executing the various control programs, and the like are stored in the ROM 802. The CPU 801 executes computational processing based on the various control programs and maps stored in the ROM 802. The RAM 803 is a memory that temporarily stores the results of computational processing with the CPU 801, data input from various sensors, and the like, and the backup RAM 804 is a nonvolatile memory that stores data from the RAM 803 that should be saved when the engine 10 is stopped. Via a bi-directional bus 807, the CPU 801, the ROM 802, the RAM 803, and the backup RAM 804 are connected to each other, and also connected to an input interface 805 and an output interface 806.

Connected to the input interface 805 are various sensors for detecting the operating state (or the state of travel) of the vehicle in which the above vehicle drive apparatus is mounted. Specifically, connected to the input interface 805 are, for example, a lever position sensor 81, an accelerator operation amount sensor 82, an engine revolution speed sensor 83, an output shaft revolution speed sensor 84 that also functions as a vehicle speed sensor, an input shaft revolution speed sensor 85, and a turbine revolution speed sensor 86. The lever position sensor 81, for example, is provided with a plurality of ON-OFF switches that detect that the shift lever 87 has been operated to a shift position such as the parking position "P", the reverse position "R", the neutral position "N", and the drive position "D".

Signals that indicate, for example, a lever position (operating position) PSH of the shift lever 87, an operation amount θACC of an accelerator operation member such as an accelerator pedal (accelerator operation amount), a revolution speed NE of the engine 10 (engine revolution speed), a revolution speed NOUT of the output shaft 48 of the belt-driven continuously variable transmission 40 (output shaft revolution speed), a revolution speed NIN of the input shaft 47 of the belt-driven continuously variable transmission 40 (input shaft revolution speed), and a revolution speed NT of the turbine shaft 28 of the torque converter 20 (turbine revolution speed) are supplied to the electronic control apparatus 80 from each of these various sensors. The turbine revolution speed NT matches the input shaft revolution speed NIN during forward travel, in which state the forward movement clutch C1 of the forward/reverse switching apparatus 30 has been engaged. The output shaft revolution speed NOUT corresponds to a vehicle speed V. The accelerator opening degree θACC expresses the driver's requested amount of output.

Linear solenoid valves SLP, SLS, and SLT, an ON-OFF solenoid valve SL1, and the like of the oil pressure control circuit 100 are connected to the output interface 806. The electronic control apparatus 80 controls exciting current of the linear solenoid valves SLP, SLS, and SLT of the oil pressure control circuit 100, and along with respectively regulating control oil pressures PSLP, PSLS, and PSLT that are output from these linear solenoid valves SLP, SLS, and SLT, switches the ON-OFF solenoid valve SL1 of the oil pressure control circuit 100 between an ON state (excited state) and an OFF state (non-excited state). Thus, control to regulate the gearshift oil pressure PIN and the clamping oil pressure POUT of the belt-driven continuously variable transmission 40, control of engagement/release of the friction engaging elements for travel of the forward/reverse switching apparatus 30, control of engagement/release of the lockup clutch 26, and control to regulate the line oil pressure PL, and the like are performed.

Figure 3:
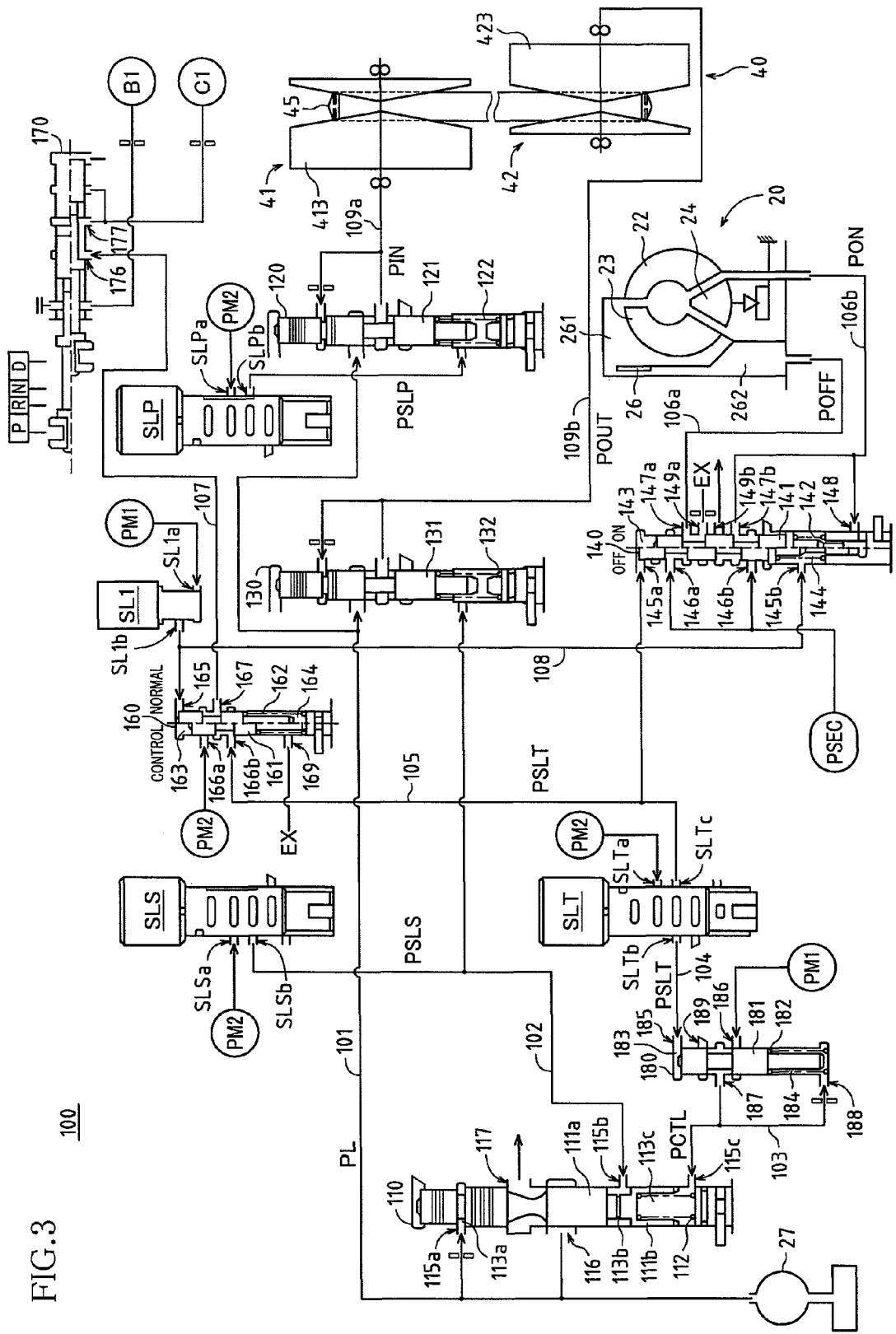
FIG. 3 is a circuit diagram that shows an example of an oil pressure control circuit for controlling the power transmission mechanism of the vehicle drive apparatus in FIG. 1.

FIG. 3 is a circuit diagram that shows an example of an oil pressure control circuit for controlling the power transmission mechanism of the above vehicle drive apparatus.

The oil pressure control circuit 100 shown by way of example in FIG. 3 includes the oil pump 27, the gearshift oil pressure control valve 120, the clamping oil pressure control valve 130, the lockup control valve 140, and the manual valve 170 described above, and further includes a primary regulator valve 110, a garage shift valve 160, and a depressurizing valve 180. The oil pressure control circuit 100 includes the above-described linear solenoid valves SLP, SLS, and SLT, and the ON-OFF solenoid valve SL1, connected to the electronic control apparatus 80. Note that with respect to the oil pressure control circuit 100 shown in FIG. 3, a part of the oil pressure control circuit of the power transmission mechanism of the vehicle drive apparatus is schematically shown, but other than the configuration shown in FIG. 3, the actual oil pressure control also includes unshown valves, oil paths, and the like.

In the oil pressure control circuit 100, oil pressure generated by the oil pump 27 is regulated to the line oil pressure PL that becomes the source pressure of the oil pressure of various parts by the primary regulator valve 110. The line oil pressure PL regulated by the primary regulator valve 110 is supplied via an oil path 101 to various parts of the oil pressure control circuit 100, such as the gearshift oil pressure control valve 120 and the clamping oil pressure control valve 130.

The primary regulator valve 110 is provided with a first spool 111a and a second spool 111b that are movable in the axial direction, and a spring 112 that serves as a biasing means that biases the first spool 111a and the second spool 111b in one direction. In FIG. 3, the first spool 111a provided on the upper side and the second spool 111b provided on the lower side are both slidable in the vertical direction. The primary regulator valve 110 is provided with control ports 115a, 115b, and 115c, an input port 116, and an output port 117.

With the first spool 111a, the input port 116 and the output port 117 are put in communication or blocked from each other. The spring 112 is disposed in a compressed state in a control oil pressure chamber 113c provided on one end side (the lower end side in FIG. 3) of the second spool 111b. That is, the control oil pressure chamber 113c is a spring chamber where the spring 112 is disposed. With biasing force of the spring 112, the second spool 111b and the first spool 111a are pressed against in the direction (the upper direction in FIG. 3) that the input port 116 and the output port 117 are blocked.

The control port 115a is connected to a control oil pressure chamber 113a provided on the other end side (the upper end side in FIG. 3) of the first spool 111a. Also, the control port 115a is connected to the oil path 101. Via this control port 115a, the line oil pressure PL is supplied to a control oil pressure chamber 113a.

The control port 115b is connected to a control oil pressure chamber 113b provided between one end side of the first spool 111a and the other end side of the second spool 111b. Also, the control port 115b is connected to an output port SLSb of the linear solenoid valve SLS via an oil path 102. Via this control port 115b, the output oil pressure (control oil pressure) PSLS of the linear solenoid valve SLS is supplied to the control oil pressure chamber 113b.

The control port 115c is connected to the above-described control oil pressure chamber 113c. Also, the control port 115c is connected to an output port 187 of the depressurizing valve 180 via an oil path 103. Via this control port 115c, an output oil pressure PCTL of the depressurizing valve 180 is supplied to the control oil pressure chamber 113c.

The input port 116 is connected to the oil path 101. The line oil pressure PL is input via the input port 116. The output port 117 is connected to an unshown secondary regulator valve.

The first spool 111a slides vertically according to the balance between the line oil pressure PL that is introduced to the control oil pressure chamber 113a, and the combined force of the control oil pressure PSLS that is introduced to the control oil pressure chamber 113b or the output oil pressure PCTL of the depressurizing valve 180 that is introduced to the control oil pressure chamber 113c, and the biasing force of the spring 112. While the combined force is greater than the force from the line oil pressure PL, the input port 116 and the output port 117 are blocked from each other. On the other hand, when the line oil pressure PL is greater than the combined force, the first spool 111a moves downward in FIG. 3, so the input port 116 and the output port 117 are put in communication with each other. Thus, by oil pressure from the oil path 101 being drained via the output port 117, the line oil pressure PL is adjusted. Accordingly, by controlling the oil pressure of at least one of the control oil pressure PSLS of the linear solenoid valve SLS and the output oil pressure PCTL of the depressurizing valve 180 (in other words, the control oil pressure PSLT of the linear solenoid valve SLT), it is possible to control regulation of the line oil pressure PL.

Here, the first spool 111a and the second spool 111b are formed with the same diameter. Therefore, the acting area (pressure receiving area) of the control oil pressure PSLS supplied via the control port 115b on the first spool 111a, the acting area (pressure receiving area) of the control oil pressure PSLS on the second spool 111b, and the acting area (pressure receiving area) of the output oil pressure PCTL supplied via the control port 115c on the second spool 111b are the same.

Thus, the higher oil pressure among the control oil pressure PSLS introduced to the control oil pressure chamber 113b and the output oil pressure PCTL of the depressurizing valve 180 introduced to the control oil pressure chamber 113c contributes to the combined force described above. That is, the primary regulator valve 110 is configured to control regulation of the line oil pressure PL by selecting the higher oil pressure among the control oil pressure PSLS and the output oil pressure PCTL. Specifically, the primary regulator valve 110 is configured such that the first spool 111a moves vertically separated from the second spool 111b when the control oil pressure PSLS is higher than the output oil pressure PCTL, and the first spool 111a and the second spool 111b move vertically together in contact with each other as a single body when the output oil pressure PCTL is higher than the control oil pressure PSLS. In this way, when controlling the line oil pressure PL, without computing, for example, the two control oil pressures PSLS and PSLT, the higher oil pressure among the two control oil pressures PSLS and PCTL is selected automatically, so it is possible to easily control the line oil pressure PL.

The gearshift oil pressure control valve 120 is provided with a spool 121 that is movable in the axial direction and a spring 122 that serves as a biasing means that biases the spool 121 in one direction. The gearshift oil pressure control valve 120 is configured to continuously control regulation of the line oil pressure PL that becomes the source pressure, using the output oil pressure (control oil pressure) PSLP of the linear solenoid valve SLP as a pilot pressure. The oil pressure (gearshift oil pressure PIN) adjusted by the gearshift oil pressure control valve 120 is supplied to the oil pressure actuator 413 of the driving-side pulley 41 via an oil path 109a.

Accordingly, control of regulation of the gearshift oil pressure PIN is performed by controlling the control oil pressure PSLP of the linear solenoid valve SLP. Because the above control oil pressure PSLP changes linearly according to the exciting current, a gear ratio γ of the belt-driven continuously variable transmission 40 changes continuously according to this control oil pressure PSLP. In this case, for example, such that a target input shaft revolution speed is set based on the vehicle state indicated by the actual vehicle speed V and the accelerator opening degree θ ACC from a gearshift map that has been stored in advance in the ROM 802 matches the actual input shaft revolution speed NIN, the gear ratio γ of the belt-driven continuously variable transmission 40 is changed according to the difference (deviation) between those revolution speeds. The gearshift map indicates gearshift conditions, and for example, provides the relationship between the vehicle speed V and the target input shaft revolution speed, which is the target input revolution speed of the belt-driven continuously variable transmission 40, using the accelerator opening degree θ ACC as a parameter.

The clamping oil pressure control valve 130 is provided with a spool 131 that is movable in the axial direction and a spring 132 that serves as a biasing means that biases the spool 131 in one direction. The clamping oil pressure control valve 130 is configured to continuously control regulation of the line oil pressure PL that becomes the source pressure, using the control oil pressure PSLS of the linear solenoid valve SLS as a pilot pressure. The oil pressure (clamping oil pressure POUT) adjusted by the clamping oil pressure control valve 130 is supplied to the oil pressure actuator 423 of the driven-side pulley 42 via an oil path 109b.

Accordingly, control of regulation of the clamping oil pressure POUT is performed by controlling the control oil pressure PSLS of the linear solenoid valve SLS. Because the above control oil pressure PSLS changes linearly according to the exciting current, the belt clamping pressure of the belt-driven continuously variable transmission 40 is changed continuously according to this control oil pressure PSLS. In this case, for example, the clamping oil pressure POUT of the oil pressure actuator 423 of the driven-side pulley 42 is regulated such that a necessary target gearshift oil pressure, that is set based on the vehicle state indicated by the actual gear ratio γ and the accelerator opening degree θ ACC from a clamping map that has been stored in advance in the ROM 802, is obtained, and the belt clamping pressure of the belt-driven continuously variable transmission 40 is changed according to this belt clamping pressure POUT. The clamping map provides the relationship between the gear ratio γ and the necessary target gearshift oil pressure, using the accelerator opening degree θ ACC as a parameter, and this relationship is obtained through testing in advance such that belt slippage does not occur.

Figure 6:
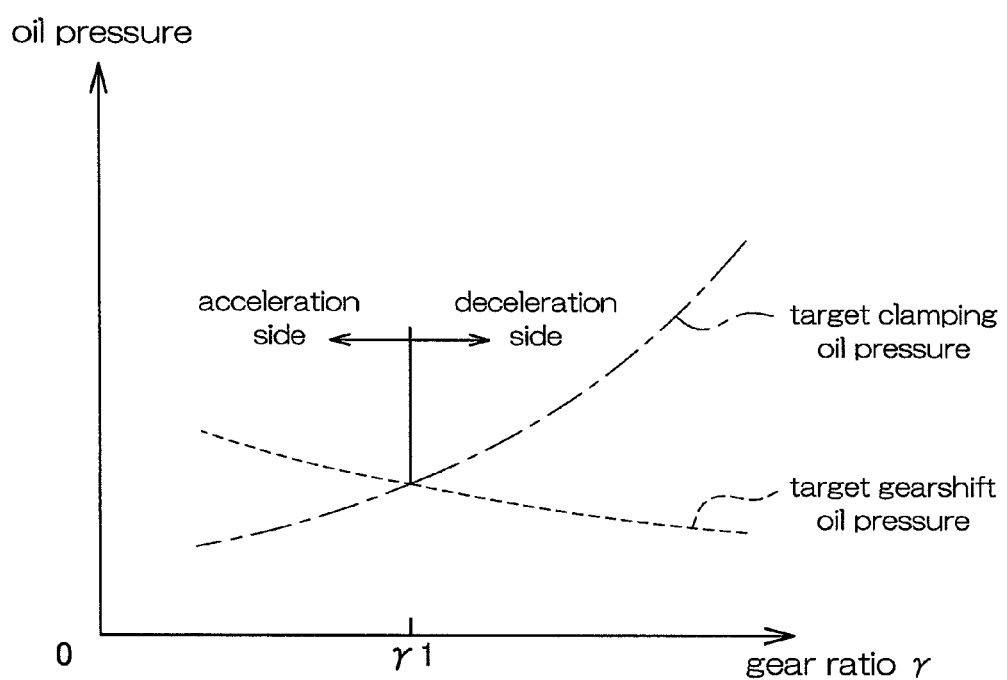
FIG. 6 shows changes in set values of a target gearshift oil pressure and a target clamping oil pressure according to a gear ratio of a belt-driven continuously variable transmission.

Here, the gearshift oil pressure PIN and the clamping oil pressure POUT are obtained by regulating the line oil pressure PL that becomes the source pressure, so it is necessary that the line oil pressure PL is at least no less than the gearshift oil pressure PIN and the clamping oil pressure POUT. Therefore, it is necessary to drive the oil pump 27 such that a line oil pressure PL is obtained that is no less than the target gearshift oil pressure and the target clamping oil pressure necessary in order to control the gear ratio γ and the clamping pressure of the belt-driven continuously variable transmission 40. In this case, the necessary target gearshift oil pressure and target clamping oil pressure are set as shown in FIG. 6, for example. FIG. 6 shows an example of changes in the set values of the necessary target gearshift oil pressure and target clamping oil pressure according to the gear ratio γ of the belt-driven continuously variable transmission 40, under conditions in which the input shaft revolution speed NIN and the input torque are fixed. In FIG. 6, the broken line indicates changes in the target gearshift oil pressure, and the single-dotted chained line indicates changes in the target clamping oil pressure.

On an acceleration side (the left side in FIG. 6) where the gear ratio γ is lower than γ1, the target gearshift oil pressure is set higher than the target clamping oil pressure, and the difference between those oil pressures increases as the degree of acceleration increases. On the other hand, on a deceleration side (the right side in FIG. 6) where the gear ratio γ is higher than γ1, the target gearshift oil pressure is set higher than the target clamping oil pressure, and the difference between those oil pressures increases as the degree of deceleration increases. That is, the set values of the target gearshift oil pressure and the target clamping oil pressure are reversed with the change in the gear ratio γ (with the above gear ratio γ1 as the switching point). In order to suppress driving failure of the oil pump 27, when the gear ratio γ is higher than γ1, it is preferable to set the line oil pressure PL to be the same as or slightly higher than the target clamping oil pressure, and when the gear ratio γ is lower than γ1, it is preferable to set the line oil pressure PL to be the same as or slightly higher than the target gearshift oil pressure. A gear ratio of "1" is given as the specific value of the gear ratio γ1, but this is not a limitation.

The depressurizing valve 180 is a regulating valve that adjusts the oil pressure introduced to the control oil pressure chamber 113c of the primary regulator valve 110. The depressurizing valve 180 is provided between the primary regulator valve 110 and the linear solenoid valve SLT. Specifically, the depressurizing valve 180 is provided with a spool 181 that is movable in the axial direction and a spring 182 that serves as a biasing means that biases the spool 181 in one direction. In FIG. 3, the spool 181 is slidable in the vertical direction. The depressurizing valve 180 is provided with a control port 185, an input port 186, an output port 187, a feedback port 188, and a drain port 189.

With the spool 181, the input port 186 and the output port 187 are put in communication or blocked from each other. The spring 182 is disposed in a compressed state in a spring chamber 184 provided on one end side of the spool 181 (the lower end side in FIG. 3). With biasing force of the spring 182, the spool 181 is pressed against in the direction (the upper direction in FIG. 3) that the input port 186 and the output port 187 are blocked.

The control port 185 is connected to a control oil pressure chamber 183 provided on the other end side (the upper end side in FIG. 3) of the spool 181. The control port 185 is connected to an output port SLTb of the linear solenoid valve SLT via an oil path 104. Via this control port 185, the output oil pressure (control oil pressure) PSLT of the linear solenoid valve SLT is supplied to the control oil pressure chamber 183.

The input port 186 is connected to an unshown first modulator valve. A first modulator oil pressure PM1 regulated by the first modulator valve using the line oil pressure PL as the source pressure is input via the input port 186. The output port 187 is connected to the control port 115c of the primary regulator valve 110 via the oil path 103 described above. The oil pressure (the output oil pressure PCTL) that has been depressurized with the depressurizing valve 180 is output from the output port 187.

The feedback port 188 is connected to the spring chamber 184. Also, the feedback port 188 is connected to the oil path 103. The same oil pressure as the output oil pressure PCTL is supplied to the spring chamber 184 via the feedback port 188.

The spool 181 slides vertically according to the balance between the control oil pressure PSLT that is introduced to the control oil pressure chamber 183, and the combined force of the output oil pressure PCTL that is introduced to the spring chamber 184 and the biasing force of the spring 182. In this case, while the biasing force of the spring 182 is greater than the force from the control oil pressure PSLT, the spool 181 is in a state fixed to the other end side, and so the input port 186 and the output port 187 are blocked from each other. In this state, the output oil pressure PCTL is not introduced to the spring chamber 184 and the control oil pressure chamber 113c of the primary regulator valve 110, and the drain port 189 and the output port 187 are in communication, so the oil pressure here is zero.

On the other hand, when the force from the control oil pressure PSLT is greater than the biasing force of the spring 182, movement to one end side of the spool 181 is permitted. With this movement, the input port 186 and the output port 187 are put in communication, and thus, the output oil pressure PCTL is introduced to the spring chamber 184 and the control oil pressure chamber 113c of the primary regulator valve 110, via the oil path 103.

Figure 4:
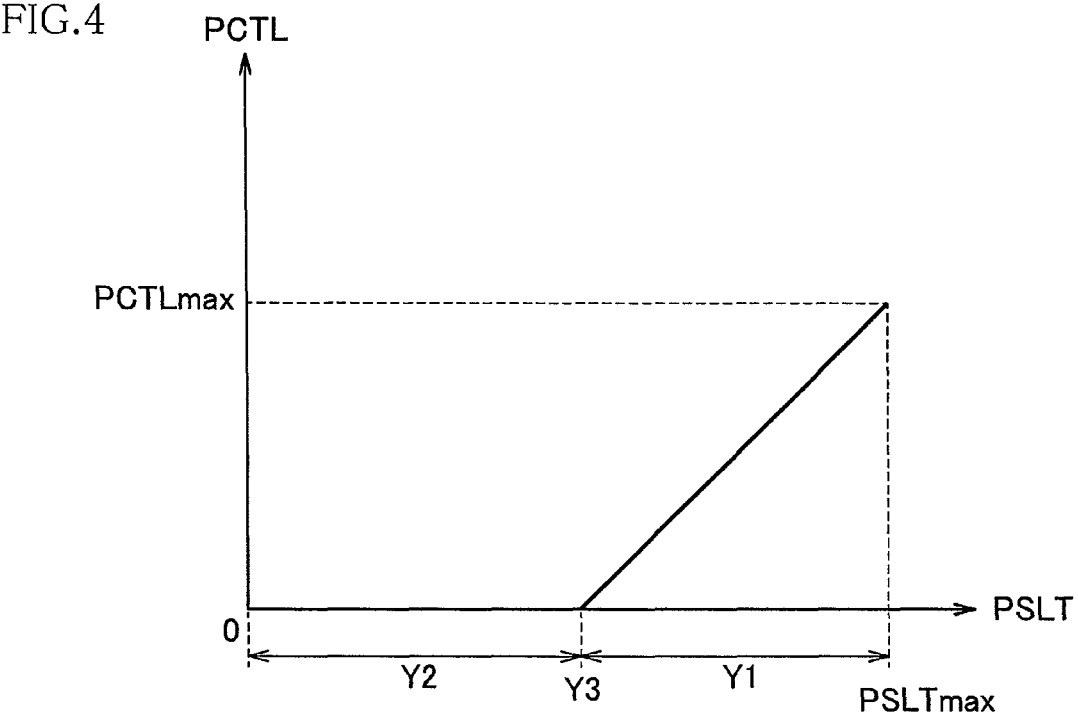
FIG. 4 shows characteristics of an output oil pressure of a depressurizing valve relative to the control oil pressure of a linear solenoid valve.

The output oil pressure PCTL that is output from the output port 187, where the biasing force (load) of the spring 182 is W1, and the acting area (pressure receiving area) of the output oil pressure PCTL supplied via the feedback port 188 on the spool 181 is S1, is (PSLT−W1/S1). Accordingly, as shown in FIG. 4, by controlling the control oil pressure PSLT of the linear solenoid valve SLT, it is possible to control regulation of the output oil pressure PCTL of the depressurizing valve 180.

In this way, with the depressurizing valve 180, the output oil pressure PCTL is a pressure that has been depressurized relative to the control oil pressure PSLT of the linear solenoid valve SLT by an oil pressure that corresponds to the biasing force of the spring 182. Thus, as described below, the linear solenoid valve SLT can be used not only for controlling regulation of the line oil pressure PL, but also for controlling engagement/release of the lockup clutch 26.

The manual valve 170 is a switching valve that switches the supply of oil pressure to the forward movement clutch C1 and the rearward movement brake B1 of the forward/rearward switching apparatus 30 according to operation of the shift lever 87. The manual valve 170 is switched corresponding to the shift positions of the shift lever 87, such as the parking position "P", the reverse position "R", the neutral position "N", and the drive position "D".

When the manual valve 170 is being switched corresponding to the parking position "P" and the neutral position "N" of the shift lever 87, oil pressure is not supplied to an oil pressure servo of the forward movement clutch C1 and an oil pressure servo of the rearward movement brake B1. Working oil of the oil pressure servo of the forward movement clutch C1 and the oil pressure servo of the rearward movement brake B1 is drained via the manual valve 170. Thus, both the forward movement clutch C1 and the rearward movement brake B1 are released.

When the manual valve 170 is being switched corresponding to the reverse position "R" of the shift lever 87, oil pressure is supplied to the oil pressure servo of the rearward movement brake B1, and oil pressure is not supplied to the oil pressure servo of the forward movement clutch C1. Working oil of the oil pressure servo of the forward movement clutch C1 is drained via the manual valve 170. Thus, the rearward movement brake B1 is engaged, and the forward movement clutch C1 is released.

When the manual valve 170 is being switched corresponding to the drive position "D" of the shift lever 87, an input port 176 and an output port 177 are in communication, and so oil pressure is supplied to the oil pressure servo of the forward movement clutch C1. On the other hand, oil pressure is not supplied to the oil pressure servo of the rearward movement brake B1. Working oil of the oil pressure servo of the rearward movement brake B1 is drained via the manual valve 170. Thus, the forward movement clutch C1 is engaged, and the rearward movement brake B1 is released. The supply of oil pressure that accompanies engagement of the forward movement clutch C1 is performed via the garage shift valve 160, described next.

The garage shift valve 160 is a switching valve that, during garage shifting, switches the oil path corresponding to a state of engagement transition or a state of engagement (a state of complete engagement) of the friction engaging elements for travel (the forward movement clutch C1 and the rearward movement brake B1) of the forward/reverse switching apparatus 30. Due to this switching of the garage shift valve 160, for example, when the shift lever 87 has been operated from a non-travel position such as the parking position "P" or the neutral position "N" to a travel position such as the drive position "D" when starting to move the vehicle or the like, the oil pressure supplied to the oil pressure servo of the forward movement clutch C1 is switched between an engagement transition oil pressure that corresponds to the state of engagement transition and an engagement holding oil pressure that corresponds to the state of complete engagement. Likewise, when the shift lever 87 has been operated to the reverse position "R", due to switching of the garage shift valve 160, the oil pressure supplied to the oil pressure servo of the rearward movement brake B1 is switched between the engagement transition oil pressure that corresponds to the state of engagement transition and the engagement holding oil pressure that corresponds to the state of complete engagement. Note that below, as a representative example, a case will be described in which the oil pressure supplied to the oil pressure servo of the forward movement clutch C1 is switched by the garage shift valve 160.

Specifically, the garage shift valve 160 is configured such that when the forward movement clutch C1 is in the state of engagement transition, the garage shift valve 160 is switched to the control position shown in the left half in FIG. 3, and when the forward movement clutch C1 is in the state of complete engagement, the garage shift valve 160 is switched to the normal position shown in the right half in FIG. 3. Switching of the garage shift valve 160 is performed by controlling the output oil pressure (control oil pressure) of the ON-OFF solenoid valve SL1.

The garage shift valve 160 is provided with a spool 161 that is movable in the axial direction and a spring 162 that serves as a biasing means that biases the spool 161 in one direction. The spool 161 is provided so as to be slidable vertically in FIG. 3. The spring 162 is disposed in a compressed state in a spring chamber 164 provided on one end side (the bottom end side in FIG. 3) of the spool 161. Due to the biasing force of the spring 162, the spool 161 is pressed against in the direction (upward in FIG. 3) that holds the garage shift valve 160 in the aforementioned normal direction. The garage shift valve 160 is provided with a control port 165, input ports 166a and 166b, an output port 167, and a drain port 169.

The control port 165c is connected to a control oil pressure chamber 163 that is provided on the other end side (the upper end side in FIG. 3) of the spool 161. Also, the control port 165 is connected to an output port SL1b of the ON-OFF solenoid valve SL1. Control oil pressure of the ON-OFF solenoid valve SL1 is supplied to the control oil pressure chamber 163 via the control port 165.

The input port 166a is connected to an unshown second modulator valve. A second modulator oil pressure PM2 regulated by a second modulator valve using the line oil pressure PL as the source pressure is input via the input port 166a. The input port 166b is connected to an output port SLTc of the linear solenoid valve SLT via an oil path 105. The control oil pressure PSLT of the linear solenoid valve SLT is input via the input port 166b. Note that the second modulator valve is provided on the downstream side of the primary regulator valve 110, and the first modulator valve is provided on the downstream side of the second modulator valve. Thus, the second modulator oil pressure PM2 is set higher than the first modulator oil pressure PM1.

The output port 167 is connected to the input port 176 of the manual valve 170 via an oil path 107. The drain port 169 is connected to the spring chamber 164.

Next is a description of switching operation of the garage shift valve 160.

In this embodiment, the ON-OFF solenoid valve SL1 is provided as a control valve for performing switching of the garage shift valve 160. The ON-OFF solenoid valve SL1 is configured to switch between the ON state and the OFF state according to commands sent from the electronic control apparatus 80. It is possible to use a normally closed-type electromagnetic valve as described below as the ON-OFF solenoid valve SL1, and a configuration may also be adopted in which a normally open-type electromagnetic valve is used. Also note that instead of the ON-OFF solenoid valve SL1, it is possible to use a linear-type electromagnetic valve, a duty-type electromagnetic valve, a three-way valve-type electromagnetic valve, or the like as the control valve for performing switching of the garage shift valve 160.

Specifically, when the ON-OFF solenoid valve SL1 is in the ON state, in which electric power is turned on, a predetermined control oil pressure is output from the output port SL1b, and that control oil pressure is supplied to the garage shift valve 160. With that control oil pressure, the spool 161 moves downward against the biasing force of the spring 162. Thus, the garage shift valve 160 is held in the control position. On the other hand, when the ON-OFF solenoid valve SL1 is in the OFF state, in which electric power is not turned on, output of that control oil pressure is stopped. With that biasing force of the spring 162, the spool 161 moves upward. Thus, the garage shift valve 160 is held in the normal position. Also, the first modulator oil pressure PM1 regulated by the first modulator valve is introduced to the ON-OFF solenoid valve SL1 via an input port SL1a.

The ON-OFF solenoid valve SL1 is controlled to the ON state during a state of engagement transition of the forward movement clutch C1 of the forward/reverse switching apparatus 30, i.e., from when the engagement operation of the forward movement clutch C1 begins until the forward movement clutch C1 reaches the state of complete engagement. Along with this, control oil pressure of the ON-OFF solenoid valve SL1 is introduced to the control oil pressure chamber 163 via the control port 165, and thus the garage shift valve 160 is held in the control position. Thus, the input port 166b and the output port 167 are in communication.

In this case, the input port 176 and the output port 177 of the manual valve 170 are in communication, so due to the input port 166b and the output port 167 being in communication, the control oil pressure PSLT of the linear solenoid valve SLT is supplied to the oil pressure servo of the forward movement clutch C1. Accordingly, when the forward movement clutch C1 is in the state of engagement transition, the engagement transition oil pressure supplied to the oil pressure servo is the control oil pressure PSLT. Thus, engagement transition of the forward movement clutch C1 is controlled by the linear solenoid valve SLT. Here, because the control oil pressure PSLT of the linear solenoid valve SLT serving as the engagement transition oil pressure changes linearly according to the exciting current (see FIG. 5), during garage shifting, smooth engagement of the forward movement clutch C1 is possible, so it is possible to suppress a shock that accompanies engagement of the forward movement clutch C1.

On the other hand, the ON-OFF solenoid valve SL1 is controlled to the OFF state during a state of complete engagement in which the forward movement clutch C1 is completely engaged (for example, during regular travel or the like). In this case, supply of the control oil pressure of the ON-OFF solenoid valve SL1 to the control oil pressure chamber 163 is stopped, so the garage shift valve 160 is held in the normal position. Thus, the input port 166a and the output port 167 are in communication. In this case, the input port 176 and the output port 177 of the manual valve 170 are in communication, so due to the input port 166a and the output port 167 being in communication, the second modulator oil pressure PM2 is supplied to the oil pressure servo of the forward movement clutch C1. Accordingly, when the forward movement clutch C1 is in the state of complete engagement, the engagement holding oil pressure supplied to the oil pressure servo is the second modulator oil pressure PM2. Here, the second modulator oil pressure PM2 is set to a fixed pressure (clutch pressure) that is no less than the control oil pressure PSLT, so it is possible to reliably hold the forward movement clutch C1 in the state of complete engagement.

Note that in a case other than that described above (a case other than when in the state of engagement transition or the state of complete engagement), the ON-OFF solenoid valve SL1 is controlled to the OFF state, and the garage shift valve 160 is held in the normal position. However, if the manual valve 170 is being switched corresponding to a position of the shift lever 87 other than a travel position such as the drive position "D", the input port 176 and the output port 177 of the manual valve 170 are blocked from each other, so the second modulator oil pressure PM2 is not supplied to the oil pressure servo of the forward movement clutch C1.

The lockup control valve 140 controls engagement/release of the lockup clutch 26. Specifically, lockup control valve 140 is configured to control engagement/release of the lockup clutch 26 by controlling the lockup differential pressure ΔP (ΔP=lockup engaging oil pressure PON−lockup releasing oil pressure POFF). Control of the lockup differential pressure ΔP by the lockup control valve 140 is performed by controlling the control oil pressure PSLT of the linear solenoid valve SLT.

The lockup control valve 140 is provided with a spool 141 that is movable in the axial direction and a spring 142 that serves as a biasing means that biases the spool 141 in one direction. In FIG. 3, the spool 141 is slidable in the vertical direction. The spring 142 is disposed in a compressed state in a spring chamber 144 provided on one end side of the spool 141 (the lower end side in FIG. 3). With biasing force of the spring 142, the spool 141 is pressed against in the direction (the upper direction in FIG. 3) that the lockup control valve 140 is held in the OFF position shown in the left half in FIG. 3. The lockup control valve 140 is provided with a control port 145a, a backup port 145b, input ports 146a and 146b, a releasing-side port 147a, an engaging-side port 147b, a feedback port 148, and drain ports 149a and 149b.

The control port 145a is connected to a control oil pressure chamber 143 provided on the other end side (the upper end side in FIG. 3) of the spool 141. The control port 145a is connected to an output port SLTc of the linear solenoid valve SLT via the oil path 105. The control oil pressure PSLT of the linear solenoid valve SLT is supplied to the control oil pressure chamber 143 via this control port 145a.

The backup port 145b is connected to the spring chamber 144. Also, the backup port 145b is connected to the output port SL1b of the ON-OFF solenoid valve SL1 via an oil path 108. The control oil pressure of the ON-OFF solenoid valve SL1 is supplied to the spring chamber 144 via the backup port 145b.

The input ports 146a and 146b are each connected to an unshown secondary regulator valve, which is connected to the output port 117 of the primary regulator valve 110. A secondary oil pressure PSEC that has been regulated by the secondary regulator valve is input via the input ports 146a and 146b.

The releasing-side port 147a is connected to the releasing-side oil pressure chamber 262 of the lockup clutch 26 via an oil path 106a. The engaging-side port 147b is connected to the engaging-side oil pressure chamber 261 of the lockup clutch 26 via an oil path 106b.

The feedback port 148 is connected to the spring chamber 144. Also, the feedback port 148 is connected to the oil path 106b. The same oil pressure as the lockup engaging oil pressure PON is supplied to the spring chamber 144 via the feedback port 148.

Next is a description of operation of the lockup clutch 26 by the lockup control valve 140.

When the control oil pressure PSLT of the linear solenoid valve SLT is introduced to the control oil pressure chamber 143 via the control port 145a, according to that control oil pressure PSLT, the lockup control valve 140 enters a state (ON state) in which the spool 141 has moved downward against the biasing force of the spring 142. In this case, the spool 141 moves further downward as the control oil pressure PSLT increases. In the right half in FIG. 3, a state is shown in which the spool 141 has moved downward as far as possible. In this state shown in the right half in FIG. 3, the input port 146b and the engaging-side port 147b are in communication, and the releasing-side port 147a and the drain port 149a are in communication. At this time, the lockup clutch 26 is in a completely engaged state.

When the lockup control valve 140 is in the ON state, the spool 141 slides vertically according to the balance of the combined force of the control oil pressure PSLT that is introduced to the control oil pressure chamber 143 and the lockup releasing oil pressure POFF that acts on the releasing-side port 147a, and the combined force of the lockup engaging oil pressure PON that is introduced to the spring chamber 144 and the biasing force of the spring 142. Here, the lockup clutch 26 is engaged according to the lockup differential pressure ΔP. Control of the lockup differential pressure ΔP is performed by controlling the control oil pressure PSLT of the linear solenoid valve SLT. Because the above control oil pressure PSLT changes linearly according to the exciting current (see FIG. 5), it is possible to continuously adjust the lockup differential pressure ΔP. Along with this, it is possible to continuously change the degree of engagement (clutch capacity) of the lockup clutch 26 according to the lockup differential pressure ΔP.

More specifically, as the control oil pressure PSLT increases, the lockup differential pressure ΔP increases, and thus the degree of engagement of the lockup clutch 26 increases. In this case, the working oil from the aforementioned secondary regulator valve is supplied to the engaging-side oil pressure chamber 261 of the lockup clutch 26 via the input port 146b, the engaging-side port 147b, and the oil path 106b. On the other hand, the working oil of the releasing-side oil pressure chamber 262 is discharged via the oil path 106a, the releasing-side port 147a, and the drain port 149a. When the lockup differential pressure ΔP becomes at least a predetermined value, the lockup clutch 26 reaches complete engagement.

Conversely, as the control oil pressure PSLT decreases, the lockup differential pressure ΔP decreases, and thus the degree of engagement of the lockup clutch 26 decreases. In this case, the working oil from the aforementioned secondary regulator valve is supplied to the releasing-side oil pressure chamber 262 via the input port 146*a*, the releasing-side port 147*a*, and the oil path 106*a*. On the other hand, the working oil of the engaging-side oil pressure chamber 261 is discharged via the oil path 106*b*, the engaging-side port 147*b*, and the drain port 149*b*. When the lockup differential pressure ΔP becomes a negative value, the lockup clutch 26 is in a released state.

On the other hand, when supply of the control oil pressure PSLT of the linear solenoid valve SLT to the control oil pressure chamber 143 is stopped, the lockup control valve 140 enters a state (OFF state) in which, as shown in the left half in FIG. 3, the spool 141 moves upward due to the biasing force of the spring 142, and is held at its original position. In this OFF state, the input port 146*a* and the releasing-side port 147*a* are in communication, and the engaging-side port 147*b* and the drain port 149*b* are in communication. At this time, the lockup clutch 26 is in a released state.

When the ON-OFF solenoid valve SL1 is in the ON state, a control is performed to forcibly release the lockup clutch 26, without controlling engagement/release of the lockup clutch 26 as described above. In other words, when the garage shift valve 160 is held at the control position, and control of engagement transition of the forward movement clutch C1 is performed, the lockup clutch 26 is forcibly released.

As described above, when the ON-OFF solenoid valve SL1 is in the ON state, the control oil pressure of the ON-OFF solenoid valve SL1 is introduced to the spring chamber 144. Due to the control oil pressure of the ON-OFF solenoid valve SL1, force in the same direction as the biasing force of the spring 142 is applied to the spool 141, so regardless of whether or not the control oil pressure PSLT of the linear solenoid valve SLT is supplied to the control oil pressure chamber 143, the lockup control valve 140 is held in the OFF state shown in the left half in FIG. 3. This is accompanied by the lockup clutch 26 being forcible released.

By forcing the lockup clutch 26 OFF in this manner, for example, when performing garage shifting when beginning vehicle movement or the like, even if a failure of the linear solenoid valve SLT to turn ON or the like occurs, it is possible to reliably return the lockup clutch 26 to the released state, and so it is possible to prevent the occurrence of an engine stall. In order to reliably return the lockup clutch 26 to the released state, a configuration may be adopted in which the combined force of the force due to the control oil pressure of the ON-OFF solenoid valve SL1 and the biasing force of the spring 142 is larger than the force due to the control oil pressure PSLT of the linear solenoid valve SLT. In this case, if the control oil pressure of the ON-OFF solenoid valve SL1 is smaller than the maximum value of the control oil pressure PSLT, for example, by setting the acting area (pressure receiving area) of the control oil pressure of the ON-OFF solenoid valve SL1 on the spool 141 to be larger than the acting area (pressure receiving area) of the control oil pressure PSLT on the spool 141, it is possible to reliably return the lockup clutch 26 to the released state.

Figure 5:
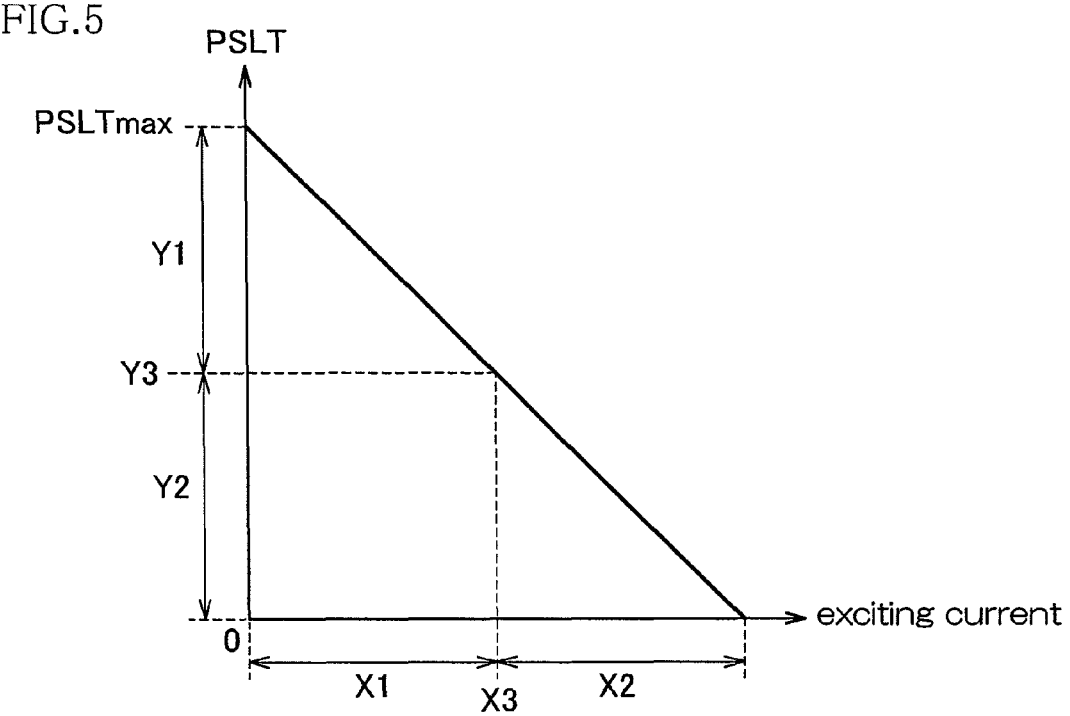
FIG. 5 shows characteristics of a control oil pressure relative to an exciting current of a linear solenoid valve.

The linear solenoid valves SLT, SLP, and SLS, are, for example, normally open-type electromagnetic valves. That is, when electrical power is not turned on, the input port and the output port are in communication, and oil pressure that has been input is output from the output port as a control oil pressure. On the other hand, when electrical power is turned on, regulation of oil pressure that has been input from the input port is controlled according to the exciting current determined by a duty signal sent from the electronic control apparatus 80, and this oil pressure is output from the output port as a control oil pressure. In this case, regulation is controlled such that the control oil pressure decreases as the exciting current increases. When the exciting current is at least a predetermined value, the control oil pressure is "0", and output of the control oil pressure is stopped. For example, as shown in FIG. 5, the control oil pressure PSLT of the linear solenoid valve SLT changes linearly according to the exciting current. Likewise, the control oil pressures PSLP and PSLS of the linear solenoid valves SLP and SLS also change linearly according to the exciting current. Note that a configuration may be adopted in which a normally closed-type electromagnetic valve is used as the linear solenoid valves SLT, SLP, and SLS.

The linear solenoid valve SLT is provided in order to perform control of regulation of the line oil pressure PL, control of engagement/release of the lockup clutch 26, and control of engagement transition of the forward movement clutch C1 (control of engagement transition oil pressure). A configuration may also be adopted in which instead of the linear solenoid valve SLT, a duty-type electromagnetic valve is used as a control valve for performing these controls.

In more detail, the second modulator oil pressure PM2 that has been regulated by the second modulator valve is introduced to the linear solenoid valve SLT via an input port SLTa. Thus, when electrical power is not turned on, the second modulator oil pressure PM2 is output as the control oil pressure PSLT, and when electrical power is turned on, oil pressure obtained by linearly controlling regulation of the second modulator oil pressure PM2 according to the exciting current is output as the control oil pressure PSLT.

The control oil pressure PSLT to be output from the output port SLTb is supplied to the depressurizing valve 180 via the oil path 104. Control of regulation of the line oil pressure PL is not performed based directly on the control oil pressure PSLT, but rather, is performed based on the output oil pressure PCTL that has been depressurized by the depressurizing valve 180 according to that control oil pressure PSLT. Also, the control oil pressure PSLT to be output from the output port SLTc is supplied to the lockup control valve 140 and to the garage shift valve 160 via the oil path 105. Control of engagement/release of the lockup clutch 26, and control of engagement transition of the forward movement clutch C1, are performed based on the control oil pressure PSLT.

The linear solenoid valve SLP is provided in order to control regulation of the gearshift oil pressure PIN of the belt-driven continuously variable transmission 40. A configuration may also be adopted in which instead of the linear solenoid valve SLP, a duty-type electromagnetic valve is used as an electromagnetic valve for controlling regulation of the gearshift oil pressure PIN.

In more detail, the second modulator oil pressure PM2 that has been regulated by the second modulator valve is introduced to the linear solenoid valve SLP via an input port SLPa. Thus, when electrical power is not turned on, the second modulator oil pressure PM2 is output as the control oil pressure PSLP, and when electrical power is turned on, oil pressure obtained by linearly controlling regulation of the second modulator oil pressure PM2 according to the exciting current is output as the control oil pressure PSLP. The control oil pressure PSLP to be output from the output port SLPb is supplied to the gearshift oil pressure control valve 120. Control of regulation of the gearshift oil pressure PIN of the belt-driven continuously variable transmission 40 is performed based on this control oil pressure PSLP.

The linear solenoid valve SLS is provided in order to control regulation of the line oil pressure PL, and to control regulation of the clamping oil pressure POUT of the belt-driven continuously variable transmission 40. A configuration may also be adopted in which instead of the linear solenoid valve SLS, a duty-type electromagnetic valve is used as an electromagnetic valve for performing these controls.

In more detail, the second modulator oil pressure PM2 that has been regulated by the second modulator valve is introduced to the linear solenoid valve SLS via an input port SLSa. Thus, when electrical power is not turned on, the second modulator oil pressure PM2 is output as the control oil pressure PSLS, and when electrical power is turned on, oil pressure obtained by linearly controlling regulation of the second modulator oil pressure PM2 according to the exciting current is output as the control oil pressure PSLS. The control oil pressure PSLS to be output from the output port SLSb is supplied to the primary regulator valve 110 and the clamping oil pressure control valve 130 via the oil path 102. Control of regulation of the line oil pressure PL and control of regulation of the clamping oil pressure POUT of the belt-driven continuously variable transmission 40 are performed based on this control oil pressure PSLS.

In the oil pressure control circuit 100 with the above configuration, control of regulation of the line oil pressure PL, control of engagement/release of the lockup clutch 26, and control of engagement transition of the forward movement clutch C1 are performed with a single electromagnetic valve (the linear solenoid valve SLT). In this embodiment, the control range of control of regulation of the line oil pressure PL (line oil pressure control range) and the control range of control of engagement/release of the lockup clutch 26 (lockup control range) by the linear solenoid valve SLT are respectively set. That is, control of regulation of the line oil pressure PL and control of engagement/release of the lockup clutch 26 are not performed at the same time. Control of engagement transition of the forward movement clutch C1 by the linear solenoid valve SLT is performed when the ON-OFF solenoid valve SL1 is in the ON state, and is not performed when the ON-OFF solenoid valve SL1 is in the OFF state.

The line oil pressure control range and the lockup control range will be described with reference to FIGS. 4 and 5. Here, it is assumed that the ON-OFF solenoid valve SL1 is in the OFF state. When the ON-OFF solenoid valve SL1 is in the ON state, the above-described control is performed to forcibly release the lockup clutch 26, and control of engagement/release of the lockup clutch 26 is not performed.

As shown in FIGS. 4 and 5, relative to the exciting current applied to the linear solenoid valve SLT, a line oil pressure control region X1 and a lockup control region X2 are set, and relative to the control oil pressure PSLT of the linear solenoid valve SLT, a line oil pressure control region Y1 and a lockup control region Y2 are set. The line oil pressure control range X1 (Y1) and the lockup control range X2 (Y2) are set in different regions that do not overlap each other. Here, the line oil pressure control range X1 (Y1) and the lockup control range X2 (Y2) are separated with a switching point X3 (Y3) as a border.

Specifically, the line oil pressure control range X1 is set in a range where the exciting current applied to the linear solenoid valve SLT is smaller than at the switching point X3, and the lockup control range X2 is set in a range where the exciting current applied to the linear solenoid valve SLT is larger than at the switching point X3. Also, the line oil pressure control range Y1 is set in a range where the control oil pressure PSLT of the linear solenoid valve SLT is larger than at the switching point Y3, and the lockup control range Y2 is set in a range where the control oil pressure PSLT of the linear solenoid valve SLT is smaller than at the switching point Y3.

The minimum value of the control oil pressure PSLT is "0", and the maximum value of the control oil pressure PSLT is PSLTmax.

Such setting of the line oil pressure control range X1 (Y1) and the lockup control range X2 (Y2) is performed by the depressurizing valve 180 provided between the linear solenoid valve SLT and the primary regulator valve 110.

As described above, when the control oil pressure PSLT is no greater than the pressure (W1/S1) from the biasing force of the spring 182 of the depressurizing valve 180, the output oil pressure PCTL of the depressurizing valve 180 is set to "0", so the output oil pressure PCTL is not introduced to the control oil pressure chamber 113c of the primary regulator valve 110. In this case, only control of engagement/release of the lockup clutch 26 is performed based on the control oil pressure PSLT; control of regulation of the line oil pressure PL is not performed based on the control oil pressure PSLT. Also, in this case, control of regulation of the line oil pressure PL is performed based on the control oil pressure PSLS of the linear solenoid valve SLS, so in the lockup control region X2 (Y2), a condition in which regulation of the line oil pressure PL is not controlled is prevented from occurring.

Accordingly, the region where the control oil pressure PSLT is no greater than the pressure (W1/S1) from the biasing force of the spring 182 is set as the lockup control region X2 (Y2). Here, the switching point X3 (Y3) corresponds to when the control oil pressure PSLT is equal to the pressure (W1/S1) from the biasing force of the spring 182, and in this case, the output oil pressure PCTL of the depressurizing valve 180 is "0". The size (width) of the lockup control range X2 (Y2) is set according to the pressure (W1/S1) from the biasing force of the spring 182. In this case, as that pressure (W1/S1) increases, the switching point X3 (Y3) is set to smaller values of the exciting current (larger values of the control oil pressure PSLT), and as a result, the lockup control range X2 (Y2) is set larger.

On the other hand, when the control oil pressure PSLT exceeds the pressure (W1/S1) from the biasing force of the spring 182, the output oil pressure PCTL of the depressurizing valve 180 is introduced to the control oil pressure chamber 113c of the primary regulator valve 110. In this case, as described above, control of regulation of the line oil pressure PL is performed based on the highest oil pressure among the output oil pressure PCTL and the control oil pressure PSLS of the linear solenoid valve SLS.

Accordingly, the region where the control oil pressure PSLT is at least as large as the pressure (W1/S1) from the biasing force of the spring 182 is set as the line oil pressure control region X1 (Y1). Here, the size (width) of the line oil pressure control range X1 (Y1) is set according to the pressure (W1/S1) from the biasing force of the spring 182. In this case, as that pressure (W1/S1) decreases, the switching point X3 (Y3) is set to larger values of the exciting current (smaller values of the control oil pressure PSLT), and as a result, the line oil pressure control range X1 (Y1) is set larger.

With this line oil pressure control range X1 (Y1) the lockup clutch 26 is held in a completely engaged state, without controlling engagement/release of the lockup clutch 26. Therefore, with this line oil pressure control range X1 (Y1), even if the control oil pressure PSLT changes, a state is maintained in which the spool 141 of the lockup control valve 140 has moved downward as much as possible (the state shown in the right side in FIG. 3). Note that a configuration may be adopted in which a state in which the spool 141 has moved downward as much as possible is obtained at the switching point X3 (Y3), and a configuration may be adopted in which a state in which the spool 141 has already moved downward as much as possible is obtained in the lockup control range X2 (Y2).

According to the configuration, with the linear solenoid valve SLT, regulation of the line oil pressure PL is controlled in the line oil pressure control range X1 (Y1), engagement/release of the lockup clutch 26 is controlled in the lockup control range X2 (Y2). In this case, with the depressurizing valve 180, the line oil pressure control range X1 (Y1) and the lockup control range X2 (Y2) are set, so it is not necessary to provide a switching valve for switching between control of regulation of the line oil pressure PL and control of engagement/release of the lockup clutch 26, or a dedicated ON-OFF electromagnetic valve for controlling that switching valve. Thus, it is possible to avoid increases in apparatus cost and size.

Here, as described above, when the gear ratio γ is higher than γ1 (see FIG. 6), it is preferable to set the line oil pressure PL to be the same as or slightly higher than the target clamping oil pressure, and in this case, by controlling regulation of the line oil pressure PL based on the control oil pressure PSLS of the linear solenoid valve SLS, it is possible to suppress driving failure of the oil pump 27. On the other hand when the gear ratio γ is lower than γ1, it is preferable to set the line oil pressure PL to be the same as or slightly higher than the target gearshift oil pressure, and in this case, by controlling regulation of the line oil pressure PL based on the output oil pressure PCTL of the depressurizing valve 180 (the control oil pressure PSLT of the linear solenoid valve SLT), it is possible to suppress driving failure of the oil pump 27.

Above, an embodiment of the invention was described, but the embodiment described here is an example, and various modifications are possible. Examples of such modifications are given below.

In the above embodiment, a case is described in which the line oil pressure control range is set to a range that is a part of the control oil pressure PSLT of the linear solenoid valve SLT (the exciting current applied to the linear solenoid valve SLT), and the lockup control range is set to the range of the remaining part, but this is not a limitation, as long as the line oil pressure control range and the lockup control range are set to ranges that do not overlap each other. In other words, a configuration may be adopted in which the line oil pressure control range and the lockup control range are set to ranges such that control of regulation of the line oil pressure PL and control of engagement/release of the lockup clutch 26 are not performed at the same time. Specifically, a configuration may be adopted in which, when the line oil pressure control range is set to a range that is a part of the control oil pressure PSLT of the linear solenoid valve SLT, of the range of the remaining part, that entire part is not set as the lockup control range, but rather, of the range of that remaining part, only a part is set as the lockup control range. For example, a configuration may be adopted in which a hysteresis of a predetermined width is provided at the border between the line oil pressure control range and the lockup control range.

In the above embodiment, a case was described in which control of regulation of the line oil pressure PL, control of engagement/release of the lockup clutch 26, and control of engagement transition of the forward movement clutch C1 are performed with the linear solenoid valve SLT, but a configuration may also be adopted in which control of engagement transition of the forward movement clutch C1 is performed with another linear solenoid valve.

Figure 7:
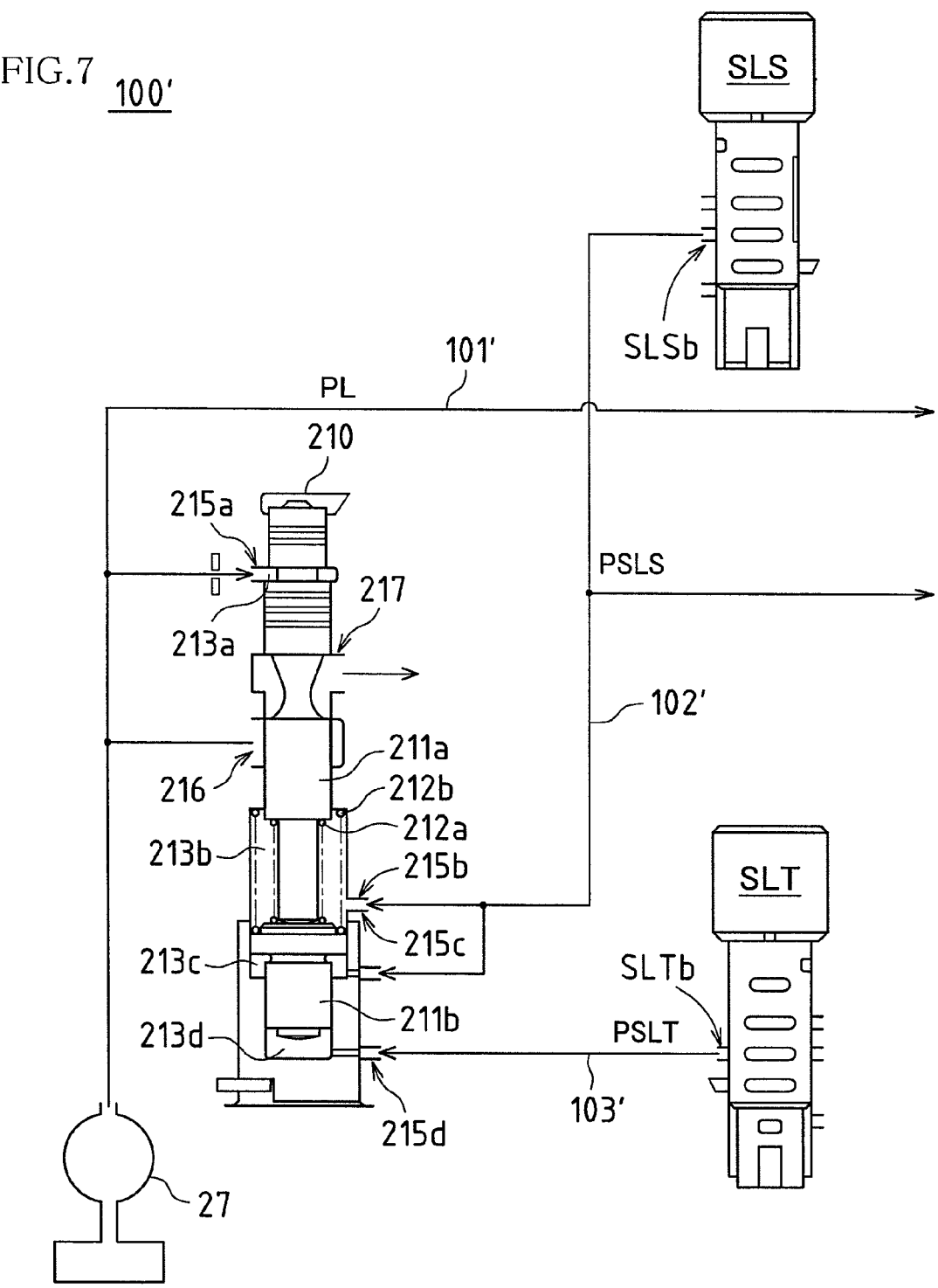
FIG. 7 shows part of an oil pressure control circuit according to another embodiment.

In the above embodiment, a case was described in which setting of the line oil pressure control range and the lockup control range is performed with the depressurizing valve 180 provided between the linear solenoid valve SLT and the primary regulator valve 110, but a configuration may also be adopted in which, for example, as shown in FIG. 7, a primary regulator valve 210 having the function of such a depressurizing valve is used. In FIG. 7, only a part of an oil pressure control circuit 100' is shown, but other than portions related to the primary regulator valve 210 having the function of a depressurizing valve, the configuration is roughly the same as the oil pressure control circuit 100 shown in FIG. 3.

This primary regulator valve 210 is provided with a first spool 211a and a second spool 211b that are movable in the axial direction, and a first spring 212a and a second spring 212b that serve as a biasing means. In FIG. 7, the first spool 211a provided on the upper side and the second spool 211b provided on the lower side are both slidable in the vertical direction. The primary regulator valve 210 is provided with control ports 215a, 215b, 215c, and 215d, an input port 216, and an output port 217.

With the first spool 211a, the input port 216 and the output port 217 are put in communication or blocked from each other. The first spring 212a and the second spring 212b are provided in a control oil pressure chamber 213b provided between one end side of the first spool 211a (the lower end side in FIG. 7) and another end side of the second spool 211b (the upper end side in FIG. 7). The first spring 212a is provided in a compressed state between the first spool 211a and the second spool 211b. With the biasing force of the first spring 212a, the first spool 211a is pressed against in the direction that the input port 216 and the output port 217 are blocked (upward in FIG. 7). The second spring 212b is provided in a compressed state between the other end side of the second spool 211b and a valve body. With biasing force of the second spring 212b, the second spool 211b is pressed against toward the one end side.

The control port 215a is connected to a control oil pressure chamber 213a provided on the other end side of the first spool 211a. Also, the control port 215a is connected to an oil path 101'. Via this control port 215a, the line oil pressure PL is supplied to the control oil pressure chamber 213a. The control port 215b is connected to the above-described control oil pressure chamber 213b. Also, the control port 215c is connected to a control oil pressure chamber 213c provided between the second spool 211b and the valve body. The control ports 215b and 215c are each connected to the output port SLSb of the linear solenoid valve SLS via an oil path 102'. The control oil pressure PSLS of the linear solenoid valve SLS is supplied to the control oil pressure chambers 213b and 213c respectively via the control ports 215b and 215c.

The control port 215d is connected to a control oil pressure chamber 213d provided at the one end side of the second spool 211b. Also, the control port 215d is connected to the output port SLTb of the linear solenoid valve SLT via an oil path 103'. The control oil pressure PSLT of the linear solenoid valve SLT is supplied to the control oil pressure chamber 213d via this control port 215d. The input port 216 is connected to the oil path 101'. The line oil pressure PL is input via the input port 116. The output port 217 is connected to an unshown secondary regulator valve.

With the primary regulator valve 210, when the control oil pressure PSLT of the linear solenoid valve SLT that is supplied to the control oil pressure chamber 213d is no more than the load of the second spring 212b, the control oil pressure PSLT does not contribute to controlling regulation of the line oil pressure PL. Beginning when the control oil pressure PSLT exceeds the load of the second spring 212b, the control oil pressure PSLT contributes to controlling regulation of the line oil pressure PL. In this case, oil pressure that has been depressurized relative to the control oil pressure PSLT by an oil pressure that corresponds to the biasing force of the second spring 212b contributes to controlling regulation of the line oil pressure PL. Accordingly, while the control oil pressure PSLT that contributes to controlling regulation of the line oil pressure PL is "0", this corresponds to the lockup control range where control of engagement/release of the lockup clutch 26 is performed, and when the control oil pressure PSLT that contributes to controlling the line oil pressure PL exceeds "0", this corresponds to the line oil pressure control range where regulation of the line oil pressure PL is controlled. In the line oil pressure control range, the acting area (pressure receiving area) of the control oil pressure PSLS supplied via the control port 215b on the first spool 211a is the same as the acting area (pressure receiving area) of the control oil pressure PSLT supplied via the control port 215d on the second spool 211b, so regulation of the line oil pressure PL is controlled with the higher oil pressure among the control oil pressures PSLS and PSLT.

The present invention may be embodied in various other forms without departing from the gist or essential characteristics thereof The embodiments disclosed in this application are to be considered in all respects as illustrative and not limiting. The scope of the invention is indicated by the appended claims rather than by the foregoing description, and all modifications or changes that come within the meaning and range of equivalency of the claims are intended to be embraced therein.

What is claimed is:

1. An oil pressure control apparatus comprising:
a belt-driven continuously variable transmission in which a belt is clamped with oil pressure to transmit motive power, and a gear ratio is changed by changing a belt contact radius;
a hydraulic lockup clutch provided in a hydrodynamic power transmission apparatus provided between a motive power source and the belt-driven continuously variable transmission, the lockup clutch directly coupling the motive power source side and the belt-driven continuously variable transmission side;
a line oil pressure control valve that regulates a line oil pressure that becomes a source pressure of oil pressure of various parts; and
a lockup control valve that is switched when performing engagement control or release control of the lockup clutch;
wherein control of the line oil pressure control valve and control of the lockup control valve are performed with one electromagnetic valve,
the control range of the line oil pressure control valve is set to a fixed range of a control oil pressure of the electromagnetic valve, and the control range of the lockup control valve is set to a remaining range, and
between the line oil pressure control valve and the electromagnetic valve, a depressurizing valve is provided that, in the control range of the lockup control valve, can set an output oil pressure to the line oil pressure control valve to "0".

2. An oil pressure control apparatus, comprising:
a belt-driven continuously variable transmission in which a belt is clamped with oil pressure to transmit motive power, and a gear ratio is changed by changing a belt contact radius;
a hydraulic lockup clutch provided in a hydrodynamic power transmission apparatus provided between a motive power source and the belt-driven continuously variable transmission, the lockup clutch directly coupling the motive power source side and the belt-driven continuously variable transmission side;
a line oil pressure control valve that regulates a line oil pressure that becomes a source pressure of oil pressure of various parts; and
a lockup control valve that is switched when performing engagement control or release control of the lockup clutch;
wherein control of the line oil pressure control valve and control of the lockup control valve are performed with one electromagnetic valve;
the control range of the line oil pressure control valve is set to a fixed range of a control oil pressure of the electromagnetic valve, and the control range of the lockup control valve is set to a remaining range; and
the line oil pressure control valve is configured such that, in the control range of the lockup control valve, the control oil pressure of the electromagnetic valve that contributes to control of the line oil pressure by the line oil pressure control valve is "0".

3. The oil pressure control apparatus according to claim 1, wherein in the control range of the lockup control valve, control of the line oil pressure control valve is performed with an electromagnetic valve other than the one electromagnetic valve.

4. The oil pressure control apparatus according claim 3, wherein the other electromagnetic valve is an electromagnetic valve that controls a clamping oil pressure control valve that supplies a clamping oil pressure that controls a belt clamping pressure of the belt-driven continuously variable transmission to a driven-side pulley of the belt-driven continuously variable transmission.

5. The oil pressure control apparatus according to claim 2, wherein in the control range of the lockup control valve, control of the line oil pressure control valve is performed with an electromagnetic valve other than the one electromagnetic valve.

6. The oil pressure control apparatus according claim 5, wherein the other electromagnetic valve is an electromagnetic valve that controls a clamping oil pressure control valve that supplies a clamping oil pressure that controls a belt clamping pressure of the belt-driven continuously variable transmission to a driven-side pulley of the belt-driven continuously variable transmission.

* * * * *